(12) United States Patent
Lee et al.

(10) Patent No.: US 9,148,462 B2
(45) Date of Patent: Sep. 29, 2015

(54) METHOD AND APPARATUS FOR CONTROLLING CONTENT PLAYBACK IN CONTENT DELIVERY SYSTEM

(75) Inventors: Byung-Rae Lee, Seoul (KR); Bo-Gyeong Kang, Seoul (KR); Sergey Nikolayevich Seleznev, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 219 days.

(21) Appl. No.: 13/052,866

(22) Filed: Mar. 21, 2011

(65) Prior Publication Data

US 2011/0231567 A1 Sep. 22, 2011

(30) Foreign Application Priority Data

Mar. 19, 2010 (KR) ........................ 10-2010-0024921

(51) Int. Cl.
G06F 15/16 (2006.01)
H04L 29/06 (2006.01)
G06F 21/10 (2013.01)

(52) U.S. Cl.
CPC .............. H04L 65/604 (2013.01); G06F 21/10 (2013.01)

(58) Field of Classification Search
CPC . G06F 21/10; G06F 21/121; H04L 29/06496; H04L 65/604
USPC ........................................................ 709/231
See application file for complete search history.

(56) References Cited

U.S. PATENT DOCUMENTS

| | | | |
|---|---|---|---|
| 6,536,037 B1* | 3/2003 | Guheen et al. | 717/151 |
| 6,922,724 B1* | 7/2005 | Freeman et al. | 709/223 |
| 6,981,262 B1* | 12/2005 | DeMello et al. | 719/310 |
| 7,158,953 B1* | 1/2007 | DeMello et al. | 705/51 |
| 7,653,709 B1* | 1/2010 | Miakinen | 709/223 |
| 8,086,957 B2* | 12/2011 | Bauchot et al. | 715/234 |
| 8,259,617 B2* | 9/2012 | Abraham et al. | 370/254 |
| 8,401,584 B2* | 3/2013 | Miller et al. | 455/519 |
| 8,516,529 B2* | 8/2013 | Lajoie et al. | 725/87 |
| 8,566,866 B1* | 10/2013 | Fleischman | 725/34 |
| 8,660,539 B2* | 2/2014 | Khambete et al. | 455/414.1 |
| 2006/0085816 A1 | 4/2006 | Funk et al. | |
| 2007/0156599 A1 | 7/2007 | Yoon et al. | |

(Continued)

FOREIGN PATENT DOCUMENTS

EP  2 325 774  5/2011
JP  2007-183964  7/2007

(Continued)

OTHER PUBLICATIONS

Marlin Developer Community: "Marlin Dynamic Media Zones Specification Version 1.1", Oct. 19, 2009.

*Primary Examiner* — Kevin Bates
*Assistant Examiner* — Clarence D McCray
(74) *Attorney, Agent, or Firm* — The Farrell Law Firm, P.C.

(57) ABSTRACT

A method is provided for controlling content playback by a terminal in a content delivery system. The method includes receiving streaming content from a service provider, the streaming content including zone information of each zone and an associated identifier of each zone for identifying a terminal's operation mode, determining the terminal's operation mode depending on the identifier, and controlling playback of the streaming content in a zone corresponding to the zone information according to the determined operation mode.

16 Claims, 3 Drawing Sheets

```
ZonePoint: {
        accessUnitReference: <media format dependent>
}
InternalZoneInfo: {
        fromPoint: integer   ~100
        toPoint: integer
        id: integer   ~110
        attributes: integer
        mediaDigestAlgorithm: integer
        mediaDigestValue: byte array
        meteringTag: string
}
ExternalZoneInfo: {
        splicePoint: integer
        id: integer
}
ZoneMap: {
        points: array of ZonePoint
        internalZones: array of InternalZoneInfo
        externalZones: array of ExternalZoneInfo
        signature: {
                signatureAlgorithm: integer
                signatureValue: byte array
        }
}
```

(56) References Cited

U.S. PATENT DOCUMENTS

| | | | |
|---|---|---|---|
| 2007/0233889 A1* | 10/2007 | Guo et al. | 709/231 |
| 2009/0031431 A1* | 1/2009 | Boccon-Gibod | 726/30 |
| 2009/0312045 A1 | 12/2009 | Miller et al. | |
| 2010/0238924 A1* | 9/2010 | Liu | 370/390 |
| 2010/0293049 A1* | 11/2010 | Maher et al. | 705/14.46 |
| 2010/0293050 A1* | 11/2010 | Maher et al. | 705/14.46 |
| 2010/0293058 A1* | 11/2010 | Maher et al. | 705/14.66 |
| 2013/0024951 A1* | 1/2013 | Bjorkengren et al. | 726/30 |

FOREIGN PATENT DOCUMENTS

| | | |
|---|---|---|
| KR | 1020050032551 | 4/2005 |
| KR | 1020090121064 | 11/2009 |

* cited by examiner

```
ZonePoint: {
        accessUnitReference: <media format dependent>
}
InternalZoneInfo: {
        fromPoint: integer
        toPoint: integer          ~100
        id: integer               ~110
        attributes: integer
        mediaDigestAlgorithm: integer
        mediaDigestValue: byte array
        meteringTag: string
}
ExternalZoneInfo: {
        splicePoint: integer
        id: integer
}
ZoneMap:  {
        points: array of ZonePoint
        internalZones: array of InternalZoneInfo
        externalZones: array of ExternalZoneInfo
        signature: {
            signatureAlgorithm: integer
            signatureValue: byte array
        }
}
```

FIG.1

```
100: NO SKIP
200: MAGNETIC
300: STICKY
```

FIG.2

```
100: NO SKIP
200: MAGNETIC
300: STICKY
400: NO SKIP, MAGNETIC
500: NO SKIP, STICKY
600: MAGNETIC, STICKY
700: NO SKIP, MAGNETIC, STICKY
```

FIG.3

```
Normal User
100: NO SKIP
110: NO SKIP
120: NO SKIP
200: MAGNETIC
300: STICKY Gold User
100:
110: NO SKIP
200: MAGNETIC
300: STICKY Premium User
100:
110:
120: NO SKIP
200: MAGNETIC
300: STICKY
```

FIG.4

LICENSE IN TERMINAL

Level X

100: NO SKIP
200: MAGNETIC
300: STICKY

CONTENT

Zone 1~Y1
Zone 2~Y2
Zone 3~Y3
⋮

FIG.5

Normal User
100: STICKY
200: MAGNETIC
300: STICKY, MAGNETIC
400: NO SKIP, MAGNETIC Gold User
100: NO SKIP
200: MAGNETIC
300: NO SKIP, MAGNETIC
400: MAGNETIC Premium User
100:
200:
300: NO SKIP
400:

FIG.6

METHOD AND APPARATUS FOR CONTROLLING CONTENT PLAYBACK IN CONTENT DELIVERY SYSTEM

PRIORITY

This application claims priority under 35 U.S.C. §119(a) of a Korean Patent Application filed in the Korean Intellectual Property Office on Mar. 19, 2010 and assigned Serial No. 10-2010-0024921, the contents of which are incorporated herein by reference.

BACKGROUND OF THE INVENTION

1. Field of the Invention

The present invention relates generally to a content delivery system, and more particularly, to a method and apparatus for providing next-generation user-customized services.

2. Description of the Related Art

The rapidly evolving mobile market continuously requires the creation of new services through recombination and/or integration of the existing communication technologies. Due to the development of telecommunications and broadcasting technologies, users currently enjoy the next-generation user-customized services on a mobile terminal (hereinafter terminal) such as a cell phone and a Personal Digital Assistant (PDA) in the conventional broadcasting system or mobile communication system.

Content service is a type of next-generation user-customized service. To provide the content service, a Service Provider (SP) should have, in advance, information about both of each zone (an interval between 'fromPoint' and 'toPoint') and its associated obligation for full streaming content.

However, it is difficult to obtain both zone information and obligation information for streaming content in advance, if the streaming content is large in capacity or should last for at least a few months. In addition, a license should include both zone information and obligation information, which causes an increase in license size, making it exceedingly difficult to efficiently support the streaming content.

In order to address these and other problems, zone and obligation information for only some of the entire streaming content may be stored in the license. However, since the non-stored remaining zone and obligation information should necessarily be transmitted to a related terminal, license update should occur at regular intervals. Accordingly, there is a need for a method capable of preventing the possible increase in license size and the periodic license update.

SUMMARY OF THE INVENTION

Embodiments of the present invention provide a method and apparatus for efficiently supporting streaming content, reducing a license size, and preventing periodic license update.

In accordance with an aspect of the present invention, there is provided a method for controlling content playback by a terminal in a content delivery system, including receiving streaming content from a service provider, the streaming content including zone information of each zone and its associated identifier for identifying a terminal's operation mode, determining the terminal's operation mode depending on the identifier, and controlling playback of the streaming content in a zone corresponding to the zone information according to the determined operation mode.

In accordance with another aspect of the present invention, there is provided an apparatus for controlling content playback by a terminal in a content delivery system, including a receiver for receiving, from a service provider, streaming content in which zone information of each zone and its associated identifier for identifying a terminal's operation mode are designated, and a controller for determining the terminal's operation mode depending on the identifier, and controlling playback of the streaming content in a zone corresponding to the zone information according to the determined operation mode.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 illustrates a general structure of a Zone Map;

FIG. 2 illustrates a Behavior Identifier (ID) for control of content playback in a content delivery system according to a first embodiment of the present invention;

FIG. 3 illustrates a Behavior ID for control of content playback in a content delivery system according to a first variation of the first embodiment of the present invention;

FIG. 4 illustrates a Behavior ID for control of content playback in a content delivery system according to a first sub-embodiment of a second embodiment of the present invention;

FIG. 5 illustrates a Behavior ID for control of content playback in a content delivery system according to a second variation of the second embodiment of the present invention; and FIG. 6 illustrates a Behavior ID for control of content playback in a content delivery system according to a third variation of the second embodiment of the present invention.

Throughout the drawings, the same drawing reference numerals will be understood to refer to the same elements, features and structures.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

Although the terms defined by the Dynamic Media Zone (DMZ) standard in Marlin Developer Community (MDC) in charge of standardizing Digital Rights Management (DRM) technology will be used intact for convenience of description, this standard and its associated terms are not intended to limit the scope of the present invention, and the present invention may be applied to any systems having a similar technical background.

Important information of the DMZ standard technology includes Zone Map and Obligation.

FIG. 1 illustrates a general structure of a Zone Map.

In accordance with the Zone Map structure in FIG. 1, a zone 100 indicates a specific interval in a stream. For example, in FIG. 1, integers of 'fromPoint' and 'toPoint' define a specific interval or zone in the stream.

A Zone Identifier 110, shown as "id: integer", is an identifier for identifying each zone.

A license used in a terminal should store zone information and its associated obligation information as shown in Table 1, as follows.

TABLE 1

| Name | Type | Description |
|------|------|-------------|
| Media Zones | Value List | One or more ZoneInfo records. Each ZoneInfo record is a ValueList with the following values: |
| | Type | Description |
| | Integer | Zone Id equal to the 'id' field of one of the zones in the media's zone map. |
| | Integer | Zone type identifier. The possible type values are defined below. |
| | Integer | Bit-vector of zero or more OR-ed flag values. The possible flag values are defined below. |

A value of a ZoneInfo flag is as shown in Table 2, as follows.

TABLE 2

| Name | Value | Description |
|------|-------|-------------|
| METER | 1 | If there is a metering obligation for this content, the application MUST also log a metering event when this zone has been played. |
| INCLUDE_SPLICE | 2 | If this flag is set, the span of media inside this zone includes the media in the zones spliced at its 'end' point, if any. If this flag is not set, the span of media inside this zone does not include the zone(s) spliced at its 'end' point. |

A definition of Zone Types is as shown in Table 3, as follows.

TABLE 3

| Name | Identifier | Description |
|------|------------|-------------|
| NOSKIP | 0 | The player application MUST NOT automatically skip this zone; the zone MUST be played as an integral part of the presentation. This type does not, however, prevent fast-forwarding or skipping once zone play has begun. |
| MAGNETIC | 1 | This zone is magnetic: if the player application attempts to seek to a position inside the zone, then the playback MUST begin at the 'fromPoint' point of the zone. |
| STICKY | 2 | This zone is sticky: if the player enters this zone, it MUST disable the ability to fast-forward or to skip this zone until the playback position is outside the zone. |

First Embodiment

FIG. 2 illustrates a structure of a Behavior ID for control of content playback in a content delivery system according to a first embodiment of the present invention.

In the first embodiment, Zone Map and Obligation of streaming content may be effectively supported by redefining a Zone ID as a Behavior ID to support streaming content.

As illustrated in FIG. 1, while a Zone ID included in Table 1 is an identifier for a location or a zone, a Behavior ID in the first embodiment is an identifier for identifying an operation mode of a terminal. In other words, while 'id' in InternalZoneInfo in Zone Map is an identifier for a specific zone in content, the Behavior ID is defined as an identifier for identifying an operation of a terminal for a specific zone, in the present invention.

While 'id' may be redefined as an identifier for a terminal's operation, the present invention discloses adding a new Behavior ID field specifying a terminal's operation, in InternalZoneInfo.

A service provider designates zone information of each zone and its associated Behavior ID in streaming content, and delivers the streaming content to a terminal. Both Zone ID and Zone Type ID are included in the conventional license, whereas only a basic definition of a Behavior ID is recorded in a license and delivered to a terminal in the first embodiment of the present invention.

To support the content that is not subject to DRM protection, the definition of a Behavior ID is may be included in a general file when being transmitted to a terminal, instead of in the license.

If the method of the first embodiment is applied, a service provider is not required to acquire both zone information and its associated obligation information in advance, and a license is allowed to have only a basic definition of each Behavior ID, making it possible to reduce the license size and avoid the periodic license update.

Prior to a description of FIG. 2, the terms used in FIG. 2 will be defined below.

NO SKIP: indicates that a media player cannot skip this zone during playback.

MAGNETIC: indicates that content playback must restart at 'fromPoint' in a zone if a media player plays the content beginning from a specific point in the zone instead of sequentially playing the content from 'fromPoint', for example, if a user clicks a halfway point in the zone with a mouse so as to play the content beginning from a specific point in the zone.

STICKY: indicates a ban on Fast Forward or SKIP.

A Behavior ID may be configured as shown in FIG. 2, but not limited thereto.

For example, referring to FIG. 2, if a Behavior ID is designated as '100', an event related to 100=NO SKIP may be applied to the zone. If a Behavior ID is designated as '200', an event related to 200=MAGNETIC may be applied to the zone. If a Behavior ID is designated as '300', an event related to 300=STICKY may be applied to the zone.

First Variation of First Embodiment

FIG. 3 illustrates a Behavior ID for control of content playback in a content delivery system according to a first variation of the first embodiment of the present invention.

In the first variation of the first embodiment, the Behavior ID of the first embodiment, defined in FIG. 2, is disclosed as a Behavior ID as shown in FIG. 3, and a Behavior ID is allocated to each Zone Type as in FIG. 2. In addition, a new Behavior ID is allocated through a combination of Behavior IDs. That is, referring to FIG. 3, if a Behavior ID is designated as '400', an event related to 400=NO SKIP & MAGNETIC may be applied to the zone. If a Behavior ID is designated as '500', an event related to 500=NO SKIP & STICKY may be applied to the zone. If a Behavior ID is designated as '600', an event related to 600=MAGNETIC & STICKY may be applied to the zone. If a Behavior ID is designated as '700', an event related to 700=NO SKIP & MAGNETIC & STICKY may be applied to the zone.

The Behavior ID defined in a license is delivered to a terminal by a service provider. In other words, the service provider designates zone information and an associated Behavior ID for the zone in streaming content by means of the Behavior ID illustrated in FIG. 2, and delivers the streaming content to the terminal. The terminal employs a Forced Play Out policy that controls a ban on forced play out for each zone depending on the Behavior ID defined in a license.

Second Embodiment

A second embodiment of the present invention provides a method for differentiating the right associated with a subscription level of a user who uses a terminal based on the first embodiment of the present invention. For example, the subscription levels may be divided into levels premium, gold, and normal, according to the subscription fee selected by the user. That is, the second embodiment provides a method for differentiating the type of an obligation applied to each Zone Map according to the subscription level.

First Variation of the Second Embodiment

FIG. 4 illustrates a Behavior ID for control of content playback in a content delivery system according to a first variation of the second embodiment of the present invention.

In the first variation of the second embodiment, each Behavior ID in Obligation is subdivided, making it possible to distinguish normal, gold, and premium users merely with a license. That is, a service provider may transmit only one type of stream without the need to transmit different types of streams according to the subscription levels. A terminal employs a Forced Play Out function associated with a Behavior ID defined in its own license. In other words, when a service provider designates a Behavior ID for a specific zone as '110', a terminal for a normal user or a gold user may apply an event related to 110=NO SKIP to the zone. When the service provider designates a Behavior ID for a specific zone as '110', a terminal for a premium user does not apply any obligations because there is no definition of a Behavior ID=110.

Second Variation of the Second Embodiment

FIG. 5 illustrates a Behavior ID for control of content playback in a content delivery system according to a second variation of the second embodiment of the present invention.

In the second variation of the second embodiment, all terminals have their licenses in which the same Behavior ID is defined. However, for differentiation of terminals having their own subscription levels, an 'X' value in which a user's subscription level is defined is designated in a license. A service provider designates a 'Y' value indicative of a commercial value of content in each zone of streaming content. Therefore, a terminal determines its applicability of a Behavior ID allocated to each zone by comparing the 'X' and 'Y' values. For example, if the 'X' value is less than or equal to the 'Y' value, the terminal may apply an obligation applied to a Behavior ID, such as "NO SKIP". However, if the 'X' value is greater than the 'Y' value, the terminal cannot apply the obligation.

Third Variation of the Second Embodiment

FIG. 6 illustrates a structure of a Behavior ID for control of content playback in a content delivery system according to a third variation of the second embodiment of the present invention.

The third variation of the second embodiment provides a method for differentiating application of NO SKIP, MAGNETIC, and STICKY in a license according to the subscription levels of users.

Since STICKY includes NO SKIP and bans an action such as Fast Forward as defined in Table 3, it may be considered that STICKY is stricter in application than NO SKIP. Therefore, as illustrated in FIG. 6, if a Behavior ID is set as '100', no obligation is applied to a premium user, but NO SKIP is applied to a gold user and STICKY is applied to a normal user.

Having stored a specific table in which Behavior IDs are defined, a terminal receives, from a service provider, streaming content in which zone information of each zone and its associated Behavior ID are designated. In the present invention, delivering a Behavior ID to a terminal is equivalent to including (or storing) a Behavior ID in a license.

A terminal maps zone information of each zone and its associated Behavior ID, included in the streaming content, to its own Behavior ID.

As is apparent from the foregoing description, the present invention can efficiently support streaming content, reduce the license size, and avoid the periodic license update.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling content playback by a terminal in a content delivery system, the method comprising:
    receiving streaming content from a service provider, the streaming content having one or more zones and at least one Behavior ID associated with at least one of the one or more zones;
    determining one or more obligations of each zone within the streaming content using a definition for each of the at least one Behavior ID, where the definition is defined in a license; and
    controlling playback of each zone of the streaming content according to the determined one or more obligations,
    wherein the definition of the at least one Behavior ID indicates one or more obligations according to a user level value, and
    wherein the license is used to distinguish the user level value.

2. The method of claim 1, wherein each zone has a corresponding Behavior ID included in the streaming content received from the service provider, and the determining one or more obligations of each zone within the streaming content comprises:
    mapping the Behavior ID of each zone to a definition of the Behavior ID stored in the license on the terminal.

3. The method of claim 1, wherein the one or more obligations includes one of NOSKIP, MAGNETIC, and STICKY.

4. The method of claim 3, wherein the NOSKIP indicates that a media player cannot skip this zone during playback,
    wherein the MAGNETIC indicates that the media player must restart at 'fromPoint' a zone if the media player plays the content beginning from a specific point in the zone, and
    wherein the STICKY indicates a ban on one of Fast Forward and SKIP.

5. An apparatus for controlling content playback by a terminal in a content delivery system, the apparatus comprising:
    a receiver that receives, from a service provider, streaming content, the streaming content having one or more zones and at least one Behavior ID associated with at least one of the one or more zones; and
    a controller that determines one or more obligations of each zone within the streaming content using a definition for each of the at least one Behavior ID, where the definition is defined in a license, and controlling playback of each zone of the streaming content according to the determined one or more obligations,
    wherein the definition of the at least one Behavior ID indicates one or more obligations according to a user level value and wherein the license is used to distinguish the user level value.

6. The apparatus of claim 5, wherein each zone has a corresponding Behavior ID included in the streaming content received from the service provider, and the controller determines one or more obligations of each zone within the streaming content by mapping the Behavior ID of each zone to a definition of the Behavior ID stored in the license on the terminal.

7. The apparatus of claim 5, wherein the one or more obligations include one of NOSKIP, MAGNETIC, and STICKY.

8. The apparatus of claim 7, wherein the NOSKIP indicates that a media player cannot skip this zone during playback, the MAGNETIC indicates that the media player must restart at 'fromPoint' in a zone if the media player plays the content beginning from a specific point in the zone, and the STICKY indicates a ban on one of Fast Forward and SKIP.

9. The method of claim 1, wherein zone information included in the streaming content comprises at least one of InternalZoneInfo and ExternalZoneInfo.

10. The method of claim 1, further comprising:
receiving, by the terminal, the license file separate from the streaming content in which definitions for the Behavior IDs of the one or more obligations are recorded.

11. The method of claim 10, wherein each of the definitions for the Behavior IDs of the one or more obligations is an alphanumeric sequence corresponding to at least one obligation.

12. The method of claim 11, wherein a definition for the Behavior ID of the obligation NO SKIP is 100.

13. The apparatus of claim 5, wherein zone information received in the streaming content comprises at least one of InternalZoneInfo and ExternalZoneInfo.

14. The apparatus of claim 5, wherein the license comprises a stored table in which the controller accesses definitions for the Behavior IDs of the one or more obligations.

15. The apparatus of claim 14, wherein each of the definitions for the Behavior IDs of the one or more obligations is an alphanumeric sequence corresponding to at least one obligation.

16. The apparatus of claim 15, wherein a definition for the Behavior ID of the obligation NO SKIP is 100.

* * * * *